United States Patent
Ding et al.

(10) Patent No.: US 11,751,249 B2
(45) Date of Patent: Sep. 5, 2023

(54) RANDOM ACCESS DIVERSITY

(71) Applicant: QUALCOMM Incorporated, San Diego, CA (US)

(72) Inventors: Ling Ding, Chester, NJ (US); Raghu Narayan Challa, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 16/892,498

(22) Filed: Jun. 4, 2020

(65) Prior Publication Data

US 2020/0389923 A1 Dec. 10, 2020

Related U.S. Application Data

(60) Provisional application No. 62/857,563, filed on Jun. 5, 2019.

(51) Int. Cl.
*H04W 74/08* (2009.01)
*H04L 1/08* (2006.01)
(Continued)

(52) U.S. Cl.
CPC .......... *H04W 74/0833* (2013.01); *H04L 1/08* (2013.01); *H04L 5/001* (2013.01); *H04L 41/06* (2013.01); *H04W 24/08* (2013.01)

(58) Field of Classification Search
None
See application file for complete search history.

(56) References Cited

U.S. PATENT DOCUMENTS 8,923,218 B2 12/2014 Luo et al.
2010/0067512 A1 3/2010 Nam et al.
(Continued)

FOREIGN PATENT DOCUMENTS

CN 109802714 A 5/2019
EP 3419340 A1 12/2018
(Continued)

OTHER PUBLICATIONS

International Search Report and Written Opinion—PCT/US2020/036267—ISA/EPO—dated Sep. 4, 2020.

*Primary Examiner* — Adnan Baig
(74) *Attorney, Agent, or Firm* — Danai Nelisile Mhembere; Procopio, Cory, Hargreaves & Savitch LLP

(57) ABSTRACT

Methods, systems, and devices for wireless communication are described. For a user equipment with a number of M greater than or equal to two antennas, a signal is transmitted from at least a first antenna and a second antenna at a first time with an initial relative phase state including a first relative phase rotation between the signals transmitted by the first and second antennas. In response to a determination that a response signal was not received at the user equipment, the signal is retransmitted from at least the first antenna and the second antenna with a subsequent relative phase state among the transmitting antennas, including a second different relative phase rotation, at a second time. The second time may be the next subsequent retransmission of the signal or may be a retransmission following one or more retransmissions using the first relative phase rotation.

31 Claims, 8 Drawing Sheets

(51) Int. Cl.
*H04L 5/00* (2006.01)
*H04L 41/06* (2022.01)
*H04W 24/08* (2009.01)

(56) References Cited

U.S. PATENT DOCUMENTS

| | | | |
|---|---|---|---|
| 2014/0205042 A1* | 7/2014 | Kludt | H04B 7/0693 375/299 |
| 2014/0293874 A1* | 10/2014 | Oh | H04B 7/0689 370/328 |
| 2015/0288497 A1* | 10/2015 | Li | H04B 7/0647 370/329 |
| 2018/0098357 A1 | 4/2018 | Rico Alvarino et al. | |
| 2018/0159375 A1* | 6/2018 | Adolf | H02J 50/40 |
| 2018/0176882 A1* | 6/2018 | Ramkumar | H04W 88/04 |
| 2019/0342925 A1* | 11/2019 | Zhang | H04W 52/36 |
| 2019/0357272 A1* | 11/2019 | Lim | H04W 74/0841 |
| 2020/0389870 A1* | 12/2020 | Shin | H04L 5/0094 |
| 2021/0092766 A1* | 3/2021 | Wu | H04W 74/0833 |

FOREIGN PATENT DOCUMENTS

| | | | | |
|---|---|---|---|---|
| WO | 2018128284 A1 | 7/2018 | | |
| WO | 2019001967 A1 | 1/2019 | | |
| WO | WO-2019001967 A1 * | 1/2019 | | H04B 7/0617 |
| WO | 2020009511 A1 | 1/2020 | | |

\* cited by examiner

RANDOM ACCESS DIVERSITY

CLAIM OF PRIORITY

The current application claims priority to U.S. Provisional Application Ser. No. 62/857,563, entitled "Random Access Diversity," filed on Jun. 5, 2019 and incorporated by reference in its entirety herein.

BACKGROUND

The following relates generally to wireless communication, and more specifically to wireless communication incorporating diversity techniques for a random access or other procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Techniques under development provide for new spectrum and new network configurations to improve performance and capability of telecommunications networks. Some new techniques are part of the fifth generation new radio (5G NR) development. 5G is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, increased demand for mobile broadband access provides motivation for further improvements in 5G technology. Preferably, these improvements should be applicable to other multi-access technologies and the telecommunication standards that employ these technologies.

SUMMARY

Methods, systems, and devices for wireless communication are described. In one aspect, a method of wireless communication is performed by a user equipment (UE) with a number of M antennas including a first antenna and a second antenna. The UE may generate a first random access message (for example, in response to initiation of a random access channel (RACH) process between the UE and a network apparatus (e.g., next generation/gigallodeB or gNB)). The first random access message may be a RACH msg 1 as in current 3GPP standards. The UE may send the first random access message to the network apparatus using at least the first antenna and the second antenna of the M antennas on physical random access channel (PRACH) resources. The UE transmits signals from a plurality of the M antennas with an initial relative phase state among the signals transmitted by the antennas (the first antenna, the second antenna, and any additional antennas of the M antennas transmitting the first random access message). The initial relative phase state includes a first relative phase state between a signal transmitted by the first antenna and a signal transmitted by the second antenna. The relative phase state for transmission using more than one antenna encompasses relative phase rotation among the two or more transmitting antennas as well as the presence or absence of phase ramp across subcarriers. For two antennas, the relative phase rotation is the relative phase between signals transmitted by the two antennas, whereas for more than two antennas the relative phase rotation is the relative phase among signals transmitted by all of the antennas. For more than two antennas, the relative phase rotation may be described in terms of the relative phase rotation with respect to the phase of one of the antennas, in terms of the relative phase rotation with respect to a particular phase state (e.g., for an initial transmission of all antennas in-phase, subsequent relative phase rotations may be described with reference to that initial in phase state).

Subsequent to transmitting the first random access message, the UE monitors for a random access response message from the network apparatus. In response to failing to receive the random access response message from the network apparatus, the UE subsequently retransmits the first random access message using another, also referred to as subsequent relative phase state including a second relative phase state different from the first relative phase state between the signal transmitted by the first antenna and the signal transmitted by the second antenna.

In one aspect, the first relative phase state comprises a first relative phase rotation of $\varphi$ between at least the first antenna and the second antenna and the relative phase state (for a retransmission of the random access message) comprises a second relative phase rotation of $\varphi+\theta$ between at least the first antenna and the second antenna, wherein $\theta$ is in a range of $180°\pm100°$; for example, $\varphi$ may be zero degrees and $\theta$ may be 180 degrees. The PRACH resources for transmission of the first random access message include a plurality of subcarriers, and the first relative phase state has no phase ramp across the plurality of subcarriers and the second different relative phase state has no phase ramp across the plurality of subcarriers.

In one aspect, the method further comprises receiving a random access response message from the network apparatus in response to retransmitting the first random access message; and subsequently transmitting another random access message to the network apparatus using the second relative phase rotation. The another random access message may be a RACH msg 3, and the RACH msg 3 may be transmitted with the second relative phase rotation and using a phase ramp across the plurality of subcarriers.

In some implementations, prior to the retransmitting the first random access message using the second different relative phase state, the user equipment waits at least a first backoff delay amount. In some implementations, the user equipment may wait a first backoff delay amount, retransmit the first random access message using the first relative phase state, and in response to failing to receive a random access response message, may wait a second backoff delay amount before retransmitting the first random access message again using the second relative phase state. In some implementations, the user equipment may use the first relative phase state for each random access message transmission of a first random access process (initial transmission, first backoff delay, first retransmission, second backoff delay, and second retransmission), and use the second relative phase state for a second random access process. In some aspects, for each retransmission of a random access process, the transmission power may be increased from a first transmission power for the initial transmission to a second greater transmission power for the first retransmission and a third greater transmission power for a second retransmission.

In some implementations, the user equipment can transmit a random access message using two antennas (e.g., a first antenna and a second antenna), while in some the user equipment can use more than two antennas for one or more of the initial transmission or any retransmission of the random access message, up to the M total antennas. For more than two transmitting antennas, the relative phase state includes the relative phase rotation between the signals transmitted by the first and second antennas and the relative phase rotation of the additional antennas. The initial transmission may use more or fewer antennas than the retransmission(s). For example, an initial transmission may use all M antennas and if that initial transmission is not successful a first retransmission may use fewer antennas to simplify ascertaining a successful phase relationship among transmitting antennas.

In an example with four antennas, the UE can transmit the first random access message using at least the first antenna, the second antenna, the third antenna, and the fourth antenna using the initial relative phase state, wherein the initial relative phase state comprises no phase ramp across a plurality of transmission subcarriers of the PRACH resources and further comprises an initial relative phase rotation among signals transmitted by the first antenna, the second antenna, the third antenna, and the fourth antenna. The first random access message can be retransmitted using at least two of the first antenna, the second antenna, the third antenna, and the fourth antenna with no phase ramp across subcarriers and a different subsequent relative phase state among the four antennas. The different relative phase state need only differ by one relative phase rotation between transmitting antennas; for example, if the initial phase state of all four antennas was in phase (no phase rotation), then in some implementations the subsequent relative phase state could vary the relative phase for only one transmitting antenna with respect to the others.

DETAILED DESCRIPTION

Figure 1:
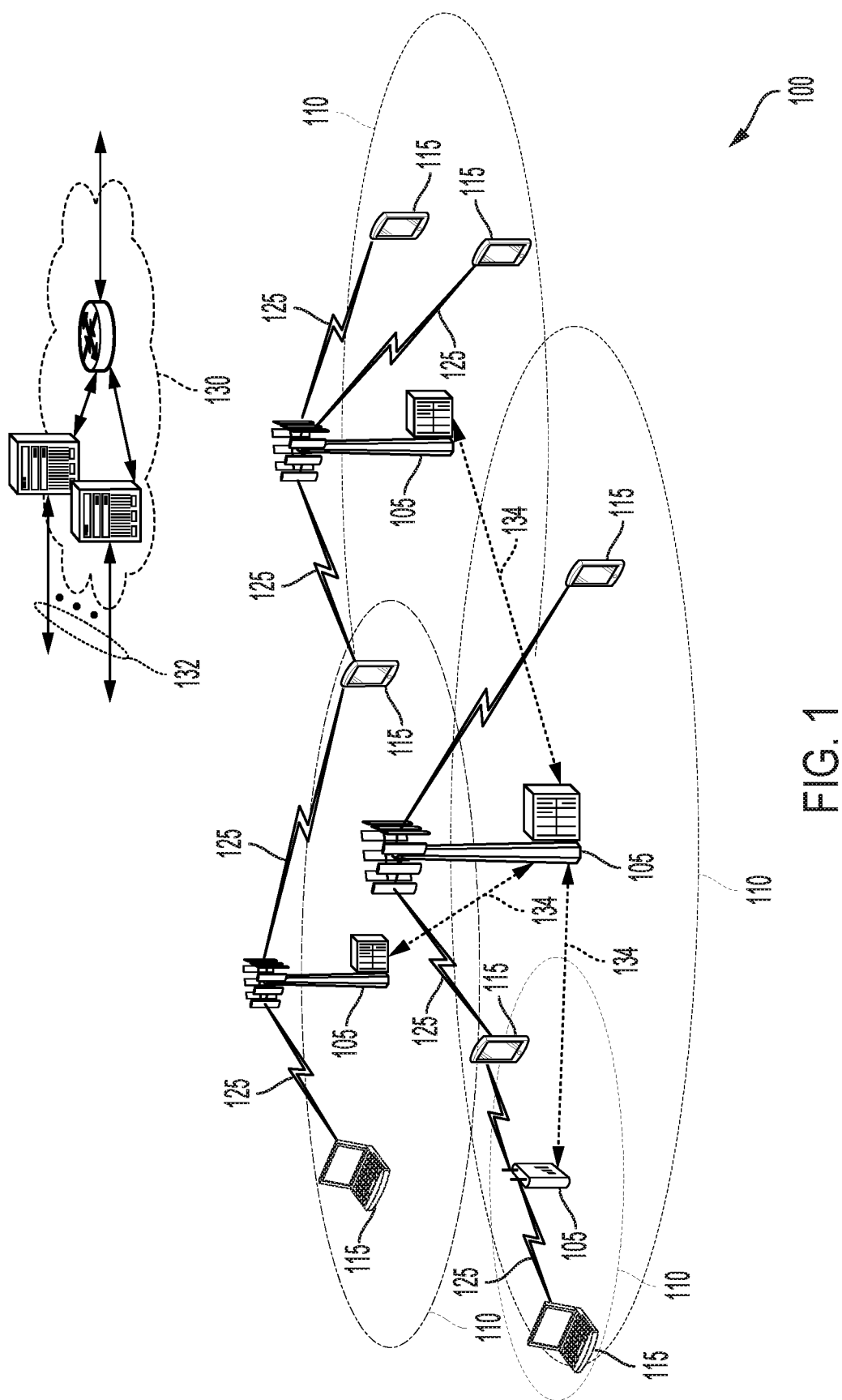
FIG. 1 illustrates an example of a wireless communications system according to some implementations.

One important aspect in wireless communications is the ability of a user equipment (UE) to connect to a network apparatus (base station, eNB, gNB, wireless access point, etc.), and to successfully handover from one network apparatus to another without disruption to ongoing communications. In current protocols, connection and handover use a physical random access channel (PRACH) process. A reliable PRACH process is an important part of robust and reliable communications systems, and since some emerging fifth generation new radio (5g NR) techniques utilize smaller cell size (which corresponds to more frequent handoff in general), its importance is projected to increase. However, successful PRACH can be a challenge in some circumstances; for example, when a UE is in a link-budget challenging environment such as a region at or near the cell edge. Since the cell size for millimeter wave (mmW) applications is relatively small, the current techniques may be particularly helpful for mmW communications and other smaller cell implementations; however, they can be beneficial for LTE/sub-6 (less than 6 GHz) spectrum as well.

Diversity techniques, such as cyclic delay diversity (CDD), can provide more reliable communications. In a simple example of a diversity technique for a two antenna system, the first antenna can send a signal x(t), while a second antenna sends a linear delayed version of the signal $x(t-t_0)$. In CDD, a cyclic delay rather than a linear delay is used to provide diversity while allowing the symbol boundaries to remain aligned. CDD is generally implemented by ramping the phase across the subcarriers to achieve the targeted delay. Applying a phase ramp in the frequency domain is equivalent to performing a cyclic shift of the samples in the time domain.

Although CDD can provide more reliable communications, in some circumstances its use may be difficult. For example, in some 5G PRACH processes, two different aspects can make diversity in PRACH transmissions challenging: the amount of delay needed for meaningful diversity, and the maximum amount of delay that can be used to determine timing with sufficient accuracy.

In order to obtain a 180° phase rotation in a communication with bandwidth B using phase ramp over the transmission subcarriers, the delay amount $t_0$ is given by $t_0=2\pi/B$. Thus, for PRACH communications with relatively small bandwidths, large delay amounts may be needed for meaningful diversity. However, in some current protocols, the network apparatus will use the uplink PRACH transmissions for uplink timing advance control for subsequent communications between the UE and the network apparatus. Large delay amounts to inject excess uncertainty in the timing determination. In general, delay amounts on the order of about 1% or more of the cyclic prefix may adversely affect the timing determination.

Techniques disclosed herein allow better diversity performance for PRACH communications without compromising the ability of the network to determine time of arrival information with targeted accuracy. According to the current techniques, rather than applying CDD in one PRACH symbol, transmit diversity schemes are used in successive PRACH transmissions. The techniques use two or more antennas (such as analog antennas or antenna ports, which can include one or more antenna elements). In the transmit diversity schemes, relative phase rotation is introduced between signals transmitted from different antennas by appropriate delay of one or more of the signals while keeping the symbol boundaries aligned.

In an example, as part of a PRACH process (access or handover), a UE with two antennas Ant 1 and Ant 2 sends a first random access message (such as RACH msg 1 in 3GPP standards) to a network apparatus. The complex channel gain from Ant 1 to the network apparatus is denoted as h1, while the complex channel gain from Ant 2 to the network apparatus is denoted as h2. The initial transmission of the random access message is sent with a first relative phase state, which can be an in-phase state with no phase ramp across subcarriers and no relative phase rotation, so that the signal has the format x(t) from Ant 1 and x(t) from Ant 2. The effective channel is the complex sum h1+h2.

Disregarding the propagation differences among different subcarriers of the signal transmitted from each of the antennas for simplicity, at a receive antenna of the network apparatus, the signals transmitted from Ant 1 and Ant 2 may constructively interfere (they are in phase at the receiver so their amplitudes combine), destructively interfere (they are out of phase at the receiver so their amplitudes cancel), or may be received at some intermediate phase state.

If the signals from the two or more antennas are received at the network apparatus in a phase state that is sufficiently aligned so that the combined received signal magnitude allows the network apparatus to process the signal and respond as expected, the network apparatus is able to determine UE timing and the PRACH process continues. If a successful processing threshold for the combination of the signals from Ant1 and Ant2 is denoted as $h_s$, then in a simple representation of the successfully received signal at the network apparatus would be $|h1+h2| \geq h_s$.

In this scenario, there is no need for the UE to retransmit the first random access message. The network apparatus sends a random access response message to the UE (e.g. a RACH msg 2 in 3GPP standards), which is then received at the UE during an expected time interval. After receipt of the message from the network apparatus, the UE processes that message and in some cases continues using the initial relative phase rotation in subsequent PRACH communications.

If the phase between the signals at the receiver is not sufficiently aligned, the network apparatus cannot successfully process the received signal, and thus the network apparatus is unable to respond to the first random access message as expected. The UE may detect the network apparatus failure to process the initial transmission by monitoring for a PRACH response over a particular time interval, and if the expected response is not received, assume that the network apparatus did not successfully receive the initial transmission.

In some circumstances there can be reasons other than phase misalignment for the network apparatus to fail to successfully receive the initial random access transmission. In addition to inadequate signal magnitude caused by excessive destructive interference of multiple copies of the signal at the receiver, the failure could be caused by multiple UEs attempting to access the same network apparatus using conflicting resources. Therefore, in some implementations, the UE may perform a process such as transmission power ramp and/or a random backoff process as described in (for example) 3GPP TS 38.321. Different embodiments of integrating the current techniques with additional (standardized) techniques are described below.

In response to determining that the expected response from the network apparatus was not received subsequent to the initial transmission of the first random access message, the UE re-transmits the first random access message, using transmit diversity with a different relative phase states between the signal transmitted from at least Ant 1 and Ant 2.

The phase states can be expressed as relative phase rotation factors between the transmissions at the antennas. With phase ramp, the relative phase rotation factors can be expressed as matrices rather than a single phase rotation factor. For example, Ant 1 may again transmit x(t), while Ant 2 transmits −x(t); i.e., the relative phase rotation factor is 180° and the transmission from Ant 2 out of phase with the transmission from Ant 1 at the UE. If the phases of h1 and h2 were substantially misaligned at the receiver for the first transmission ($|h1+h2| \ll |h1|$ or $|h2|$), then the effective channel of the PRACH retransmission h1−h2 aligns the channel gains very well.

Although initially transmitting the signals from Ant 1 and Ant 2 using a same phase state (no relative phase rotation and no phase ramp) can be beneficial, the initial phase state between the transmissions between the antennas can use a different initial relative phase rotation φ, with a subsequent retransmission at a second relative phase rotation φ+θ; for example, φ+180°.

Although selecting θ of 180° for retransmission of the first random access message is particularly beneficial when the phase of the signals at the receiver are substantially misaligned, other selections for the difference in relative phase rotation θ can be used. If the phase was only moderately misaligned during the first transmission but the value of $|h1+h2|$ was still below the successful processing threshold, an intermediate selection of about 90° could provide a beneficial choice. On the other hand, the misalignment will not be substantially improved if a value of θ that is too small is selected. For different processing thresholds and transmission power values, values of θ of 180°±100° may be useful in many circumstances.

If the network is unable to process the re-transmission of the first random access message, the UE can retransmit the first random access message again with a different relative phase rotation between the signals transmitted by Ant 1 and Ant 2. The retransmission process can continue until the phase is aligned sufficiently to allow the network apparatus to receive the first message, although as the number of retransmissions increases there is a detriment to the link budget. Further, the techniques can be used with more than two antennas. In general, for M TX antennas (M>1), in one transmission, antenna m (m=0,1, . . . , M−1) transmits $x(t)*W^m$, where W is a phase rotation factor. W can be determined as follows: in k-th transmission, $W_k = W_{k-1} * Z_k$. For example, $Z_k = 180°$, 90°, or any number in between.

FIG. 1 illustrates an example of a wireless communications system 100 that supports aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Network apparatus such as base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of network apparatus such as base stations 105 and network equipment including macro eNBs, small cell eNBs, gNB s, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Figure 2:
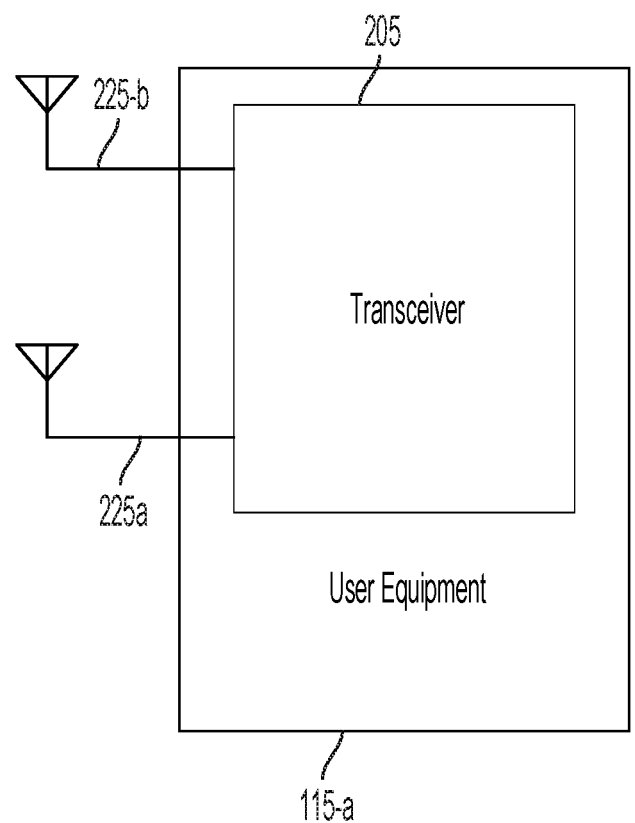
FIG. 2 is a simple diagram of a user equipment with multiple antennas, according to some implementations.
Figure 3:
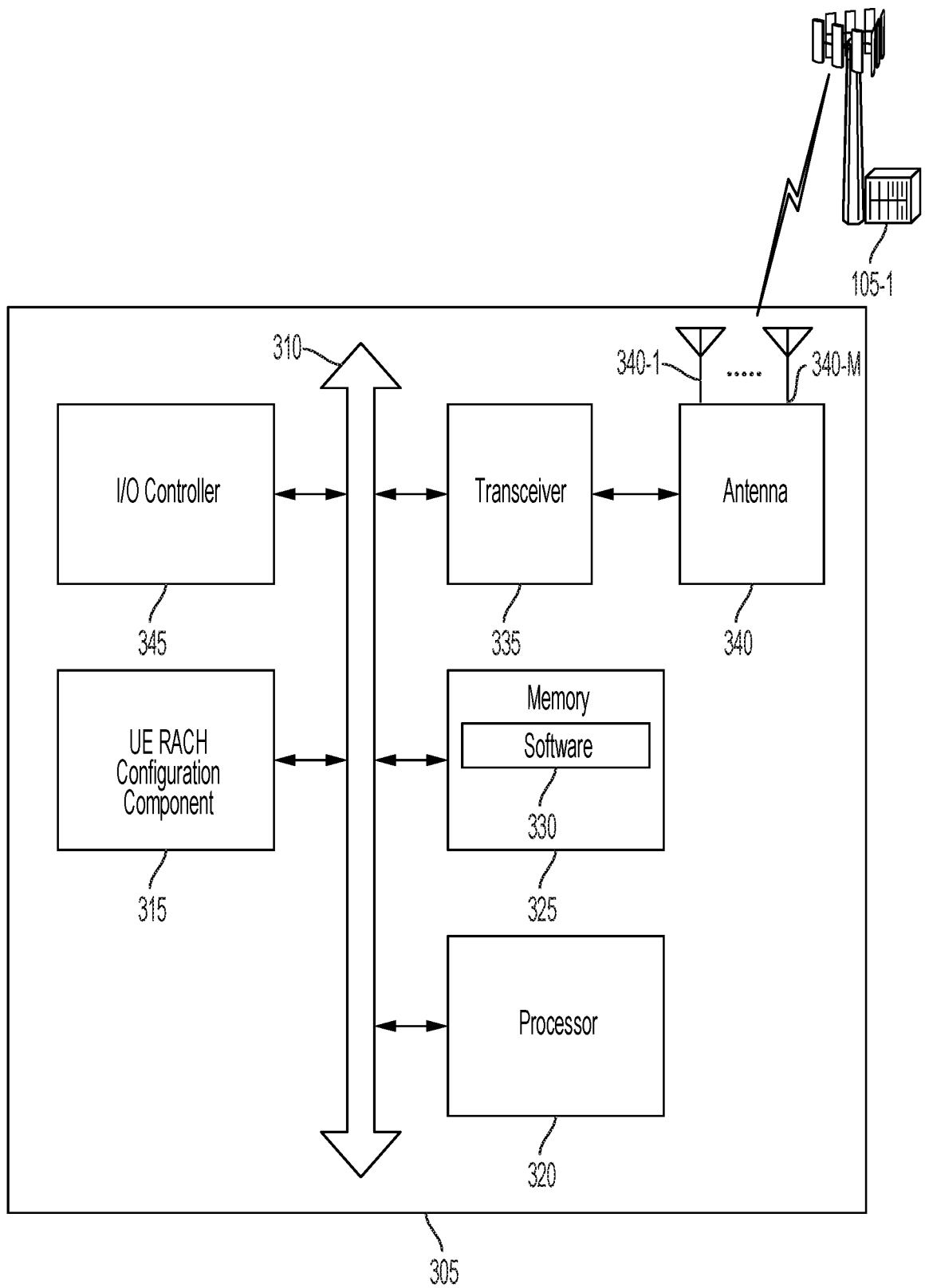
FIG. 3 is another diagram of a user equipment with multiple antennas, according to some implementations.

FIG. 2 shows a simple diagram of a UE 115-a that may be used with disclosed techniques. UE 115-a is shown with two antennas 225-a and 225-b in communication with a transceiver 205. Although transceiver 205 is shown as a single element in FIG. 2, it may include multiple structures to process input and generate output to be transmitted by antennas 225-a and 225-b. FIG. 3 shows another diagram of UE 115-a (device 305) in communication with a network apparatus 105-1. UE 115-a may include components for bi-directional voice and data communications including components for transmitting and receiving communications, including UE RACH configuration component 315, processor 320, memory 325, software 330, transceiver 335, antenna 340, and I/O controller 345. These components may be in electronic communication via one or more buses (e.g., bus 310). Device 305 may communicate wirelessly with one or more network apparatus 105-1.

Processor 320 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 320 may be configured to operate a memory array using a memory controller. In other cases, a memory controller may be integrated into processor 320. Processor 320 may be configured to execute computer-readable instructions stored in a memory to perform various functions (e.g., functions or tasks supporting different diversity procedures). RACH configuration component 315 includes processor circuitry and instructions stored in memory to implement RACH processes as described herein. Although shown separately in FIG. 3, RACH configuration component 315 may be implemented fully or partially using the processor circuitry of processor 320 and memory circuitry of memory 325.

Memory 325 may include random access memory (RAM) and read only memory (ROM). The memory 325 may store computer-readable, computer-executable software 330 including instructions that, when executed, cause the processor to perform various functions described herein. In some cases, the memory 325 may contain, among other things, a basic input/output system (BIOS) which may control basic hardware or software operation such as the interaction with peripheral components or devices.

Software 330 may include code to implement aspects of the present disclosure, including code to support different diversity configurations. Software 330 may be stored in a non-transitory computer-readable medium such as system memory or other memory. In some cases, the software 330 may not be directly executable by the processor but may cause a computer (e.g., when compiled and executed) to perform functions described herein.

Transceiver 335 may communicate bi-directionally, via one or more antennas, wired, or wireless links as described above. For example, the transceiver 335 may represent a wireless transceiver and may communicate bi-directionally with another wireless transceiver. The transceiver 335 may also include a modem to modulate the packets and provide the modulated packets to the antennas for transmission, and to demodulate packets received from the antennas.

In some cases, the wireless device may include a single antenna 340. However, in some cases the device may have more than one antenna 340, which may be capable of concurrently transmitting or receiving multiple wireless transmissions. As shown in FIG. 3, device 305 includes a plurality of antennas 340-1 to 340-M, where M is greater than or equal to two.

I/O controller 345 may manage input and output signals for device 305. I/O controller 345 may also manage peripherals not integrated into device 305. In some cases, I/O controller 345 may represent a physical connection or port to an external peripheral. In some cases, I/O controller 345 may utilize an operating system such as iOS®, ANDROID®, MS-DOS®, MS-WINDOWS®, OS/2®, UNIX®, LINUX®, or another known operating system. In other cases, I/O controller 345 may represent or interact with a modem, a keyboard, a mouse, a touchscreen, or a similar device. In some cases, I/O controller 345 may be implemented as part of a processor. In some cases, a user may interact with device 305 via I/O controller 345 or via hardware components controlled by I/O controller 345.

Figure 4:
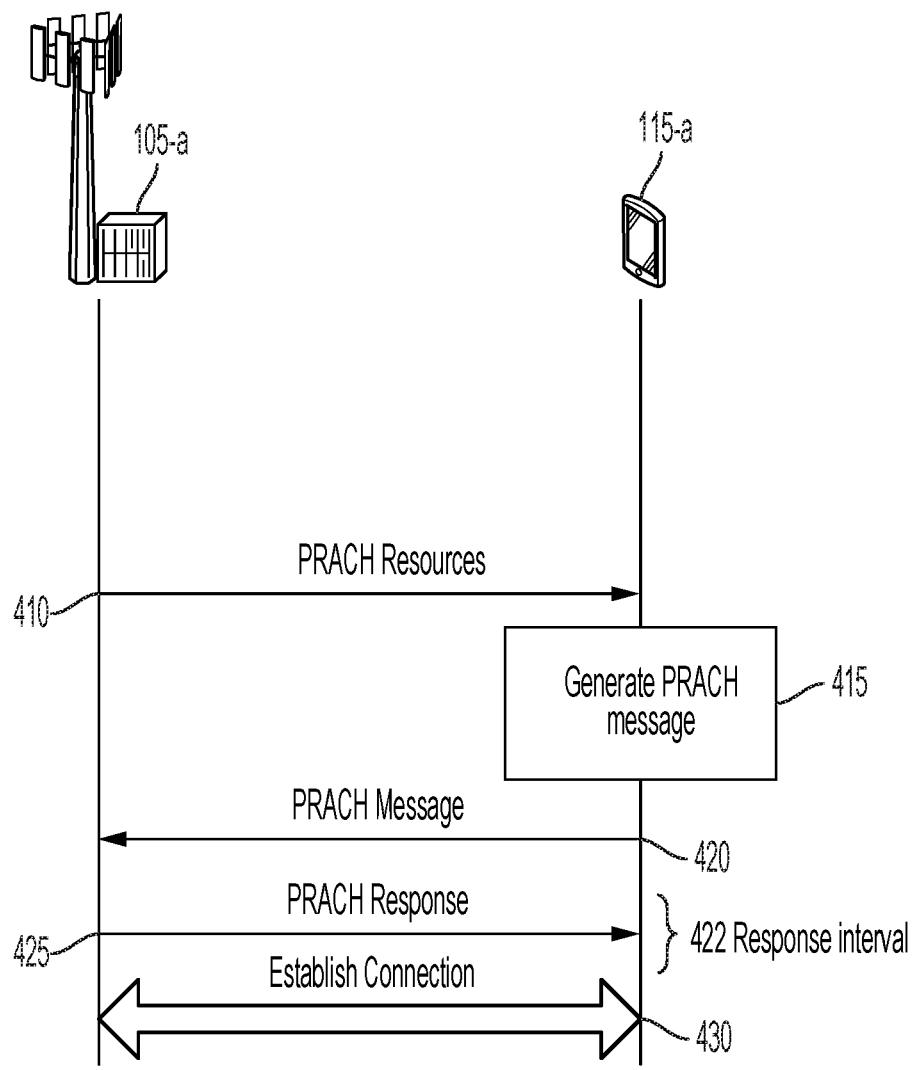
FIG. 4 is an example of a random access process between a network apparatus and a user equipment, according to some implementations.

An example random access process between a network apparatus 105-a and a UE 115-a is shown in FIG. 4. UE 115-a has at least two antennas, such as antennas 225-a and 225-b of FIG. 2 or antennas 340-1 to 340-M of FIG. 3. FIG. 4 shows an example where the first transmission of the first random access message is successful.

Referring to FIGS. 2, 3, and 4, in order to communicate with network apparatus 105-a, UE 115-a accesses information indicative of physical random access channel (PRACH) resources, which are time and frequency resources which UE 115-a can use to initiate communication with the network apparatus. In some implementations, at 410, network apparatus 105-a broadcasts information including PRACH resources to using one or more information blocks such as a System Information Block (SIB), and UE 115-a processes the transmission from network apparatus 105-a to access the PRACH resource information. UE 115-a generates a first random access message (e.g. msg 1) to transmit using the PRACH resources.

At 420, the UE transmits the first random access message to the network apparatus using the PRACH resources. Using the two antenna configuration of FIG. 2 for an example initial transmission, the transmission of the first random access message comprises transmitting a signal x(t) using antenna 225-a, and transmitting the same signal x(t) using antenna 225-b. For this example, the first relative phase rotation is zero. Although the PRACH resources generally include a plurality of subcarriers, the same phase is used across all subcarriers for both antenna 225-a and 225-b (no phase ramp).

In this example, network apparatus 105-a successfully receives the initial transmission of the first random access message and transmits a random access response (e.g. msg 2) at 425. UE 115-a expects and receives a response from network apparatus 105-a by the end of response interval 422. In this example, since UE 115-a receives the random access response message, UE 115-a and network apparatus 105-a continue the process and a connection between them is established at 430. UE 115-a may use the initial relative phase rotation (e.g., transmitted in phase) for the signals from antenna 225-a and 225-b for subsequent transmissions.

Figure 5:
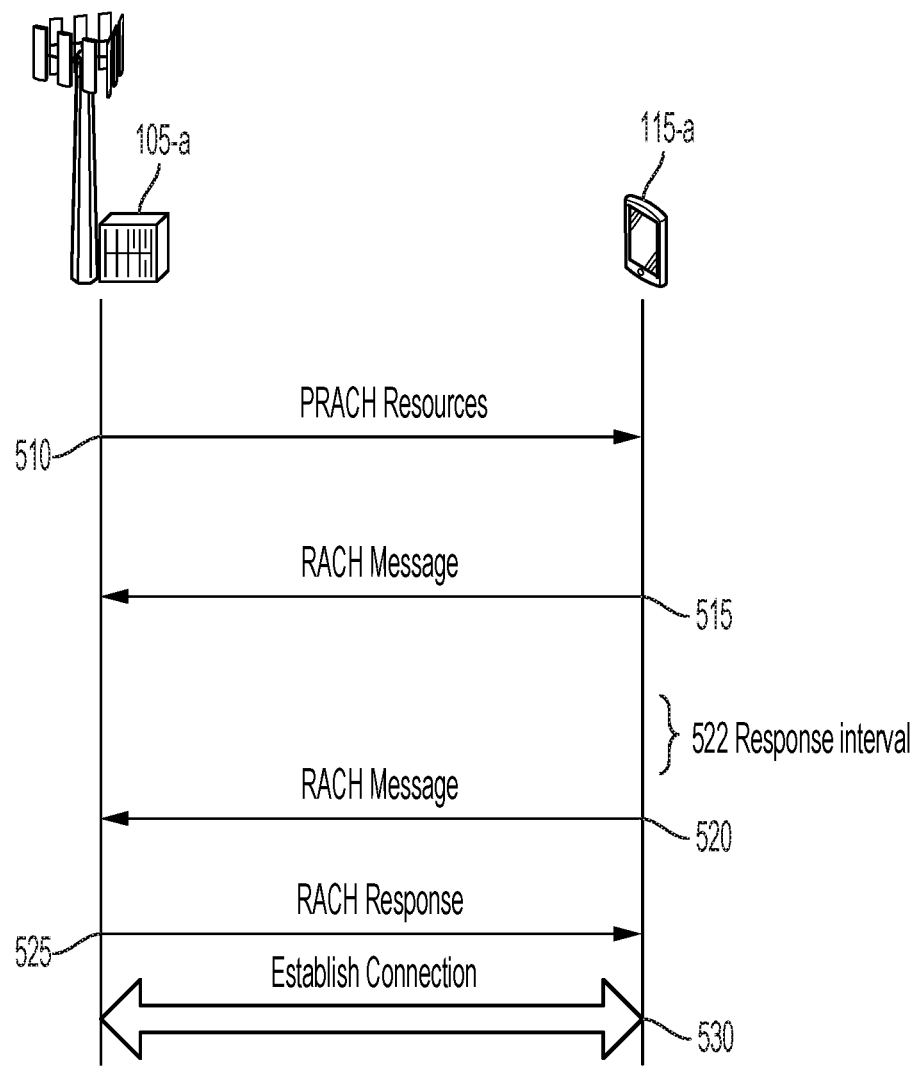
FIG. 5 is another example of a random access process between a network apparatus and a user equipment, according to some implementations.

FIG. 5 shows an example random access process between network apparatus 105-a and UE 115-a where the initial transmission of the first PRACH message is unsuccessful.

As with FIG. 4, UE 115-a accesses information indicative of PRACH resources (which may be transmitted by network apparatus 105-a at 510), and UE 115-a generates a first random access message to transmit using the PRACH resources.

Referring to FIGS. 2, 3, and 5, at 515, the UE transmits a first random access message to network apparatus 105-a using the PRACH resources. In the example initial transmission, UE 115-a transmits a first signal x(t) using antenna 225-a, and transmits the same signal x(t) using antenna 225-b (the first relative phase rotation is zero, and no phase ramp).

In this example, network apparatus 105-a does not successfully receive the initial transmission of the first random access message and so does not transmit the expected random access response message. As mentioned above, failure to successfully receive the initial transmission of the first random access message may be caused by excessive phase misalignment at the receiver between the signals transmitted by antenna 225-a and antenna 225-b, and/or multiple UEs attempting to connect to network apparatus 105-a using overlapping resources.

If UE 115-a has not received a response from network apparatus 105-a by the end of response interval 522, it may perform a backoff procedure such as the random backoff procedure in 3GPP TS 38.321, and may also change the relative phase rotation between the signals transmitted from antenna 225-a and antenna 225-b. This may be implemented in a number of ways. Two options are shown in FIG. 6A and FIG. 6B.

Figure 6A:
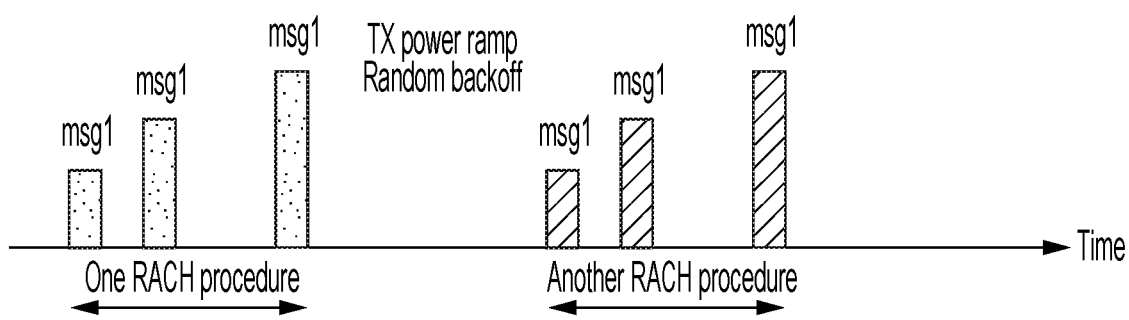
FIG. 6A is one option for incorporating transmission power ramp and backoff processes, according to some implementations.

FIG. 6A illustrates a first option. In FIG. 6A, UE 115-a keeps the same relative phase rotation between the two antennas over the course of a first RACH procedure, which can include transmission power ramp as well as a random backoff delay amount between subsequent random access message transmissions. That is, if x(t) was transmitted from both antenna 225-a and antenna 225-b, the same relative phase rotation is used when sending the re-transmission of the first random access message after the first backoff delay amount. In the process illustrated in FIG. 6A, there are two re-transmission attempts in the first RACH procedure. In the first re-transmission attempt, the transmission power is increased and the first random access message is retransmitted after a first backoff delay amount, but with the same relative phase rotation between the signals sent from antenna 225-a and antenna 225-b. If UE 115-a fails to receive the random access response from the network apparatus 105-a, it makes a second re-transmission attempt at a higher transmission power and with the same relative phase rotation. If that fails, a subsequent RACH procedure is initiated and a different relative phase rotation is used for that subsequent RACH procedure.

Figure 6B:
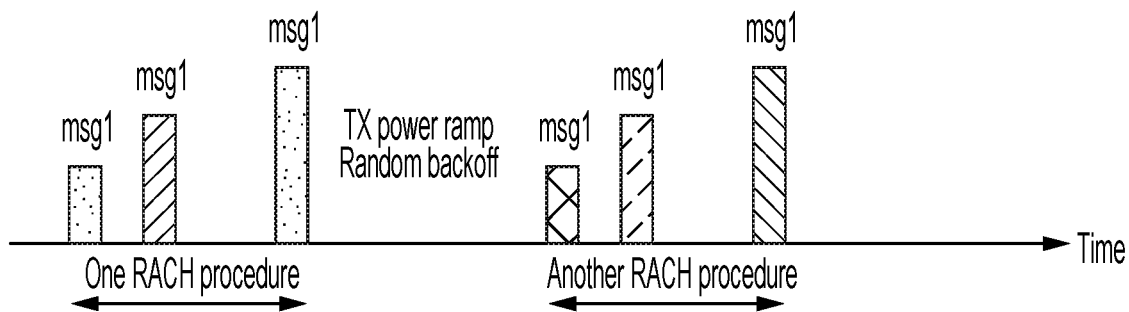
FIG. 6B is another option for incorporation transmission power ramp and backoff processes, according to some implementations.

FIG. 6B shows a second option, where the relative phase rotation between the signals transmitted from the antennas is varied as the random backoff process is performed. A first relative phase rotation between the signals from antenna 225-a and 225-b is used for the initial transmission of the first random access message from UE 115-a to network apparatus 105-a (e.g., msg 1). If UE 115-a fails to receive the random access response from network apparatus 105-a (e.g., msg 2), it retransmits the first random access message at increased power and after a backoff delay amount. UE 115-a uses a different relative phase rotation between the signals from antenna 225-a and 225-b for this re-transmission of the first random access message. If UE 115-a fails to receive a random access response from network apparatus 105-a, it performs an additional retransmission of the first random access message using a different relative phase rotation, with the transmission power increased again and after a backoff delay amount that may be the same or different than the first backoff delay amount. If UE 115-*a* again fails to receive a random access response from network apparatus 105-*a*, it may initiate a subsequent RACH procedure. As shown in FIG. 6B, each transmission of the first random access message in the subsequent RACH procedure may have a relative phase rotation different from those used in the previous RACH.

Other options can be used. For example, UE 115-*a* may transmit the first random access message using an initial relative phase rotation between the signals transmitted from antenna 225-*a* and 225-*b* (such as both antennas transmitting x(t)), and use the same relative phase rotation for the first retransmission (e.g., with a ramp of transmission power and a backoff delay amount after the first transmission). If UE 115-*a* fails to receive a random access response from network apparatus 105-*a* after the first retransmission, it may subsequently transmit the first random access message using a different relative phase rotation between the signals transmitted from antenna 225-*a* and 225-*b* (such as one antenna transmitting x(t) and the other transmitting −x(t)). In this example, if the first retransmission at the same relative phase rotation is successful the initial failure was caused by multiple attempted UE accesses. If the first retransmission was unsuccessful, it is possible that both failures were due to multiple attempted UE accesses, but it is more likely that the phase at the receiver is misaligned.

As noted above, the techniques herein can be used with more than two antennas. In general, for M TX antennas (M>1), in one transmission, antenna m (m=0,1, ..., M−1) transmits x(t)*$W^m$, where W is a phase rotation factor. W can be determined as follows: in k-th transmission, $W_k = W_{k-1} * Z_k$. For example, $Z_k = 180°$, $90°$, or any number in between.

For more than two antennas, the current techniques can be implemented in a number of ways. In a first example, the signals from all or a subset of all M antennas may be in phase for an initial transmission of the first random access message (initial relative phase state is zero relative phase rotation and no phase ramp). If an expected random access response message is not received, the first random access message may be subsequently retransmitted with at least one of the M antennas using a subsequent relative phase state with a different relative phase rotation than in the initial transmission. At least one subsequent transmission of the first random access message may use fewer than all of the M antennas if the random access message is not successfully received for a transmission using all of the M antennas. Different combinations of antennas may be used; for example, a first subset of the M antennas may be used in an initial transmission of the first random access message, and a second different subset used in a subsequent transmission of the first random access message. In an example, at least four antennas are used for an initial transmission of the first random access message with an initial relative phase state, and at least two of the four antennas are used for retransmitting the first random access message with a subsequent relative phase state different from the initial relative phase state.

One example for four antennas (M=4) is as follows. Let $W_0 = 1$ (phase=0°) and let $Z_k = 90°$. In the first transmission, $W^m = 1$ for m=0,1,2,3 (all four antennas transmit in phase). In the second transmission, $W^m = 1, j, -1, -j$, where j is sqrt(−1) (where the corresponding phase angles are 0°, 90°, 180°, and 270°). In the third transmission, $W^m = 1, -1, 1, -1$ (corresponding phase angles are 2*0°=0°, 2*90°=180°, 2*180°=0°, 2*270°=180°. In general, $W_0$ need not be 1 and $Z_k$ need not be 90° for embodiments in which each of the antennas have a phase rotation of a multiple of the associated initial phase rotation relative to the first antenna of the M antennas for a subsequent transmission.

Figure 7:
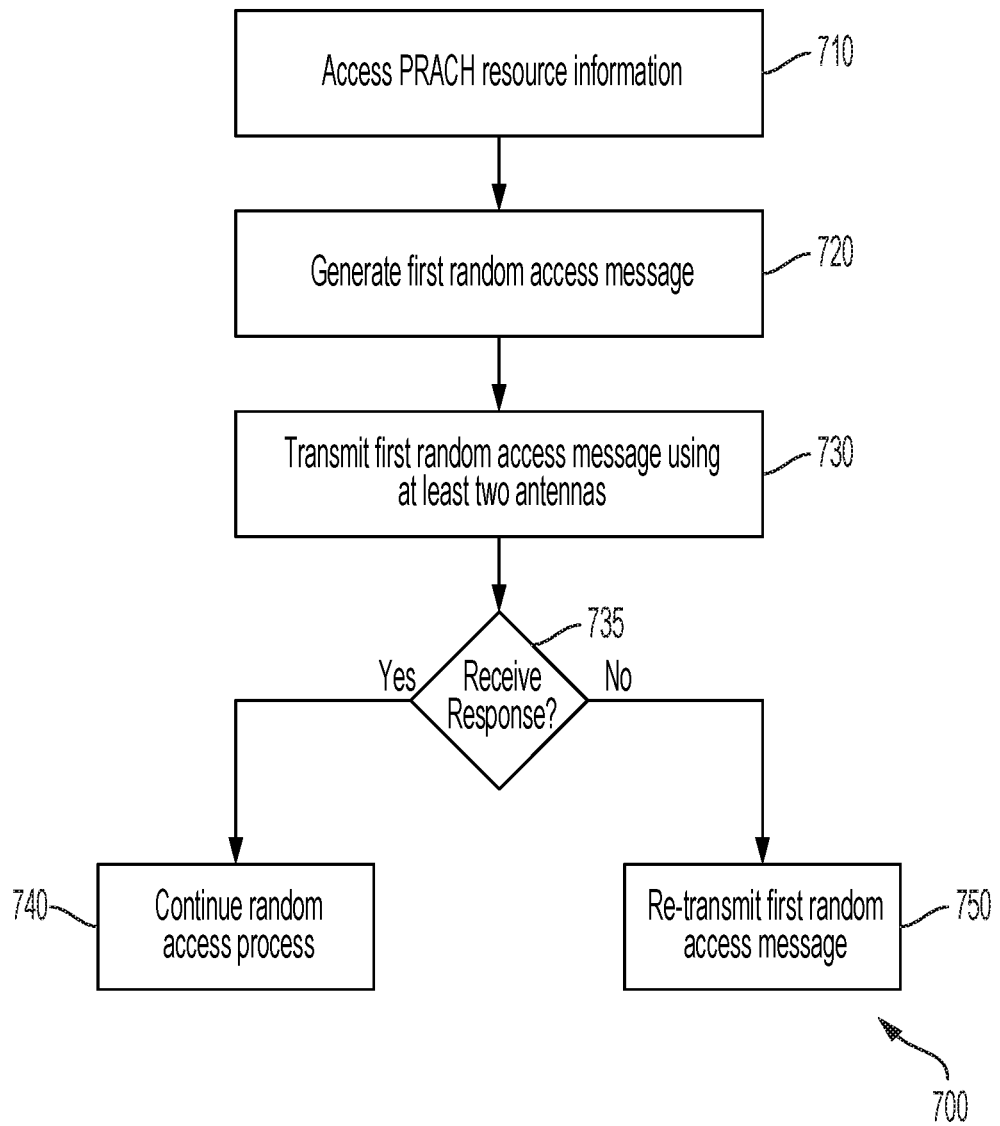
FIG. 7 shows a method to perform a random access process between a network apparatus and a user equipment, according to some implementations.

FIG. 7 shows a process 700 to implement the techniques of the current disclosure at a user equipment with M antennas, where M is equal than or greater than two. At 710, a user equipment accesses information that includes random access resources to communicate with a network apparatus, as part of an initial access or handover process (for example, in response to initiation of a random access channel (RACH) process). At 720, the user equipment generates a first random access message such as RACH msg 1 to be transmitted to the network apparatus.

At 730, the user equipment transmits the first random access message using at least a first antenna and a second antenna of the M antennas at an initial relative phase state. For example, the user equipment transmits the first random access message using no phase ramp across subcarriers and a first relative phase rotation of φ between the first antenna and the second antenna. As described above, the first random access message may be transmitted from at least the first antenna and the second antenna with no relative phase rotation (φ=0) (at least two antennas transmitting the signal x(t) in phase).

At 735, if the initial transmission of the first random access message is successful, at 740 the user equipment receives a random access response message such as RACH msg 2 from the network apparatus, and the random access process continues. The user equipment can use the initial phase rotation in subsequent transmissions such as RACH msg 3. Since the network apparatus can obtain the uplink timing information from the first random access message, in some cases subsequent transmissions can incorporate phase ramp. For example, RACH msg 3 can be transmitted from the user equipment to the network apparatus using phase ramp in cases where the gNB does not use msg 3 to estimate time of arrival for timing advance.

At 750, if the user equipment does not receive an expected random access response message from the network apparatus, the user equipment re-transmits the first random access message using a subsequent relative phase state including a second relative phase rotation of φ+θ between the signals transmitted by the first antenna and the second antenna. Also as described above, θ may be 180° since if the phase of the received signals was significantly misaligned a phase change of 180° would provide signals that are well aligned at the receiver. For the case of an initial random access message transmission from at least the first antenna and the second antenna with no relative phase rotation (φ=0), the initial transmission is in the form of x(t) from both antennas and the re-transmission in the form of x(t) and x(−t).

As noted above, in some cases the initial random access message may not have been received as a result of multiple UEs attempting to connect to the network apparatus at overlapping times (instead of or in addition to phase misalignment of signals at the receiver). In order to mitigate the issues caused by multiple access attempts, some systems use standardized procedures to delay re-transmission of the first random access message by a random backoff delay amount. The standardized procedures may also include transmission power ramp to improve the probability of successful reception at the network apparatus. For example, after an initial transmission at a first transmission power amount, the UE may wait a first backoff delay amount and then re-transmit the first random access message at a second different transmission power amount greater than the first transmission power amount. If no random access response is received, the UE may wait a second backoff delay amount and then re-transmit the first random access message at a third different power amount greater than the first and second transmission power amounts. The first and second backoff delay amounts may be random delay amounts.

Figure 8:
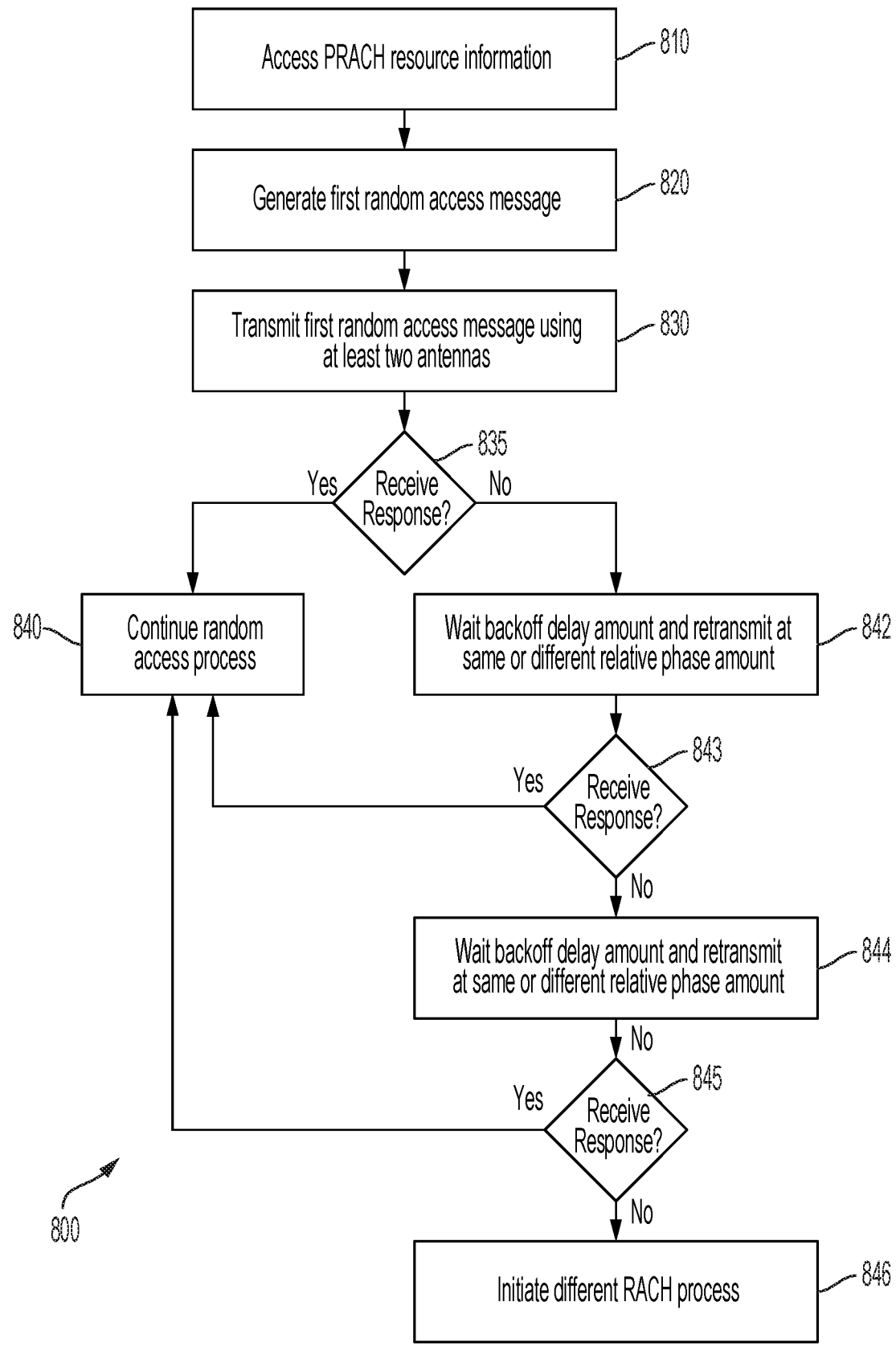
FIG. 8 shows a method to perform a random access process between a network apparatus and a user equipment, incorporating a backoff process, according to some implementations.

FIG. 8 shows a process 800 that incorporates one or more backoff delay amounts and/or transmission power increases into process 700 of FIG. 7. At 810, a user equipment accesses information that includes random access resources to communicate with a network apparatus, as part of an initial access or handover process. At 820, the user equipment generates a first random access message such as RACH msg 1 to be transmitted to the network apparatus.

At 830, the user equipment transmits the first random access message using at least a first antenna and a second antenna of the M antennas at an initial relative phase state. For example, the user equipment transmits the first random access message using no phase ramp and a first relative phase rotation of φ between the first antenna and the second antenna.

At 835, if the initial transmission of the first random access message is successful, at 840 the user equipment receives a random access response message such as RACH msg 2 from the network apparatus, and the random access process continues. The user equipment can use the first relative phase rotation in subsequent transmissions. As noted above, since the network apparatus can obtain the uplink timing information from the first random access message, in some cases subsequent transmissions can incorporate phase ramp.

At 842, if the user equipment does not receive an expected random access response message from the network apparatus, the user equipment re-transmits the first random access message at the first relative phase rotation (as in FIG. 6A) or a subsequent relative phase state including a second different relative phase rotation between the first antenna and the second antenna (as in FIG. 6B). In this implementation, the retransmission at a different relative phase rotation occurs after at least one backoff delay amount and transmission power amount increase.

If the same first relative phase rotation is used and the retransmission is successful at 843, the failure of the initial transmission was likely due to access attempts by multiple UEs, and the random access process continues (i.e., the random access process continues at 840). If the first re-transmission is not successful at 845, a second re-transmission is made at 844 after a second delay amount and second power increase and may use the first relative phase rotation (as in FIG. 6A), a second different relative phase rotation (as discussed in the alternate embodiment above), or a third different relative phase rotation (as in FIG. 6B). At 845, if this re-transmission is successful, the random access process continues (i.e. the random access process continues at 840).

If none of the transmissions of the first random access message in the RACH process is successful, another RACH process can be initiated and different relative phase rotation(s) can be used at 846. The above can continue until the RACH process is successful or the attempted connection or handover is deemed failed.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof, in general by any suitable means adapted to perform the respective function(s). If implemented in software executed by a processor, the functions may be stored on or transmitted over as one or more instructions or code on a computer-readable medium. The terms "processor," "transceiver," and other apparatus elements are used to refer to structure. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A computer storage medium may be any available medium that can be accessed by a general purpose or special purpose computer but the phrase "computer storage medium" does not refer to a transitory propagating signal. By way of example, and not limitation, computer storage media can comprise RAM, ROM, electrically erasable programmable read only memory (EEPROM), compact disk (CD) ROM or other optical disk storage, magnetic disk storage or other magnetic storage devices, or other medium that can be used to store desired program code means in the form of instructions or data structures and that can be accessed by a general-purpose or special-purpose computer, or a general-purpose or special-purpose processor. Also, a connection that transmits information is referred to as a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium.

The techniques herein are described with reference to systems that use wide bands, such as 5G or new radio (NR) systems and future systems that use spectrum in the mmW range of the electromagnetic spectrum. If applicable, techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a 5G system for purposes of example, and 5G terminology is used in much of the description above, although the techniques are applicable beyond 5G applications.

Base stations may include or may be referred to by those skilled in the art as a base transceiver station, a radio base station, an access point (AP), a radio transceiver, a NodeB, eNodeB (eNB), Home NodeB, a Home eNodeB, gNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same or similar reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

In the following, further examples are described to facilitate understanding the present disclosure:

1. A method of wireless communication at a user equipment (UE) with M antennas including a first antenna and a second antenna, the method comprising:
   generating a first random access message;
   sending the first random access message to a network apparatus using at least the first antenna and the second antenna of the M antennas on physical random access channel (PRACH) resources with an initial relative phase state including a first relative phase state between a signal transmitted by the first antenna and a signal transmitted by the second antenna;
   monitoring for a random access response message from the network apparatus;
   in response to failing to receive the random access response message from the network apparatus, retransmitting the first random access message using a subseqeunt relative phase state including a second relative phase state different from the first relative phase state between the signal transmitted by the first antenna and the signal transmitted by the second antenna.
2. The method of example 1, wherein the first relative phase state comprises a first relative phase rotation of $\varphi$ between at least the first antenna and the second antenna and wherein the second relative phase state comprises a second relative phase rotation of $\varphi+\theta$ between at least the first antenna and the second antenna, wherein $\theta$ is in a range of $180°\pm100°$.
3. The method of example 2, wherein the PRACH resources include a plurality of subcarriers, and wherein the first relative phase state has no phase ramp across the plurality of subcarriers and the second relative phase state has no phase ramp across the plurality of subcarriers.
4. The method of example 2 or 3, wherein the first relative phase rotation is zero degrees and wherein the second relative phase rotation is 180 degrees.
5. The method of one of the preceding examples, wherein the first random access message is retransmitted using a plurality of subcarriers, wherein the first relative phase state comprises a first relative phase rotation of $\varphi$ between at least the first antenna and the second antenna, wherein the second relative phase state comprises a second relative phase rotation of $\varphi+\theta$ between at least the first antenna and the second antenna and further comprises no phase ramp across the plurality of subcarriers, and wherein the method further comprises:
   receiving a random access response message from the network apparatus in response to the retransmitting the first random access message; and
   subsequently transmitting another random access message to the network apparatus using the second relative phase rotation.
6. The method of example 5, wherein subsequently transmitting another random access message to the network apparatus comprises transmitting a RACH msg 3 using the second relative phase rotation and using a phase ramp across the plurality of subcarriers.
7. The method of one of the preceding examples, wherein prior to the retransmitting the first random access message using the second relative phase state, the user equipment waits at least a first backoff delay amount.
8. The method of example 7, wherein transmitting the first random access message comprises transmitting the first random access message at a first transmission power amount and wherein retransmitting the first random access message using the second relative phase state comprises retransmitting the first random access message at a second transmission power amount greater than the first transmission power amount.
9. The method of example 7 or 8, wherein the first backoff delay amount is a random backoff delay amount.
10. The method of one of the preceding examples, wherein the M antennas further include a third antenna and a fourth antenna, and wherein sending the first random access message to the network apparatus comprises sending the first random access message using at least the first antenna, the second antenna, the third antenna, and the fourth antenna using the initial relative phase state, wherein the initial relative phase state comprises no phase ramp across a plurality of transmission subcarriers of the PRACH resources and further comprises an initial relative phase rotation among signals transmitted by the first antenna, the second antenna, the third antenna, and the fourth antenna, and wherein retransmitting the first random access message using the subsequent relative phase state comprises retransmitting the first random access message using at least two of the first antenna, the second antenna, the third antenna, and the fourth antenna with no phase ramp across subcarriers and with a subsequent relative phase state different from the initial relative phase state.
11. The method of one of the preceding examples, where M is greater than two, wherein sending the first random access message to a network apparatus comprises sending the first random access message using all M antennas, wherein the initial relative phase state is an initial relative phase state among the signals transmitted by the M antennas, and wherein retransmitting the first random access message using a subsequent relative phase state comprises retransmitting the first random access message using all M antennas with each of the antennas having an initial phase rotation relative to the first antenna of the M antennas.
12. The method of example 11, further comprising, in response to failing to receive the random access response message from the network apparatus after retransmitting the first random access message, retransmitting the first random access message using another subsequent relative phase state with each of the antennas having a phase rotation of a multiple of the associated initial phase rotation relative to the first antenna of the M antennas.
13. A user equipment (UE) comprising:
M antennas, wherein the M antennas include at least a first antenna and a second antenna;
a transceiver in communication with the M antennas;
a processor in communication with the transceiver;
memory in communication with the processor, the processor and memory configured to:
generate a first random access message;
initiate transmission of the first random access message from the UE to a network apparatus using at least the first antenna and the second antenna of the M antennas on physical random access channel (PRACH) resources with an initial relative phase state including a first relative phase state between a signal transmitted by the first antenna and a signal transmitted by the second antenna;
monitor for a random access response message from the network apparatus; and
in response to failing to receive the random access response message from the network apparatus, initiate a retransmission of the first random access message using a subsequent relative phase state including a second relative phase state different from the first relative phase state between the signal transmitted by the first antenna and the signal transmitted by the second antenna.

14. The user equipment of example 13, wherein the first relative phase state comprises a first relative phase rotation of φ between at least the first antenna and the second antenna and wherein the second relative phase state comprises a second relative phase rotation of φ+θ between at least the first antenna and the second antenna, wherein θ is in a range of 180°±100°.

15. The user equipment of example 13 or 14, wherein the PRACH resources include a plurality of subcarriers, and wherein the first relative phase state has no phase ramp across the plurality of subcarriers and the second different relative phase state has no phase ramp across the plurality of subcarriers.

16. The user equipment of one of the preceding examples 13-15, wherein the first random access message is retransmitted using a plurality of subcarriers, wherein the first relative phase state comprises a first relative phase rotation of φ between at least the first antenna and the second antenna, wherein the second relative phase state comprises a second relative phase rotation of φ+θ between at least the first antenna and the second antenna and further comprises no phase ramp across the plurality of subcarriers, and wherein the processor and memory are further configured to:

receive a random access response message from the network apparatus in response to the retransmission of the first random access message; and subsequently generate another random access message to transmit to the network apparatus using the second relative phase rotation.

17. The user equipment of example 16, wherein the another random access message comprises a RACH msg 3 and wherein the RACH msg 3 is transmitted using the second relative phase rotation and using a phase ramp across the plurality of subcarriers.

18. The user equipment of one of the preceding examples 13-17, wherein the processor and memory are further configured to wait at least a first backoff delay amount prior to the retransmitting the first random access message using the second relative phase state.

19. The user equipment of example 18, wherein the first random access message is transmitted at a first transmission power amount and retransmitted at a second transmission power amount greater than the first transmission power amount.

20. The user equipement of one of the preceding examples 13-19, wherein the M antennas are antenna elements, wherein the first random access message is a RACH msg 1, the network apparatus is a giga-NodeB (gNB) and the PRACH resources are received from the gNB in a system information block (SIB).

21. A user equipment (UE) with M antennas including a first antenna and a second antenna, the user equipment comprising:

means for generating a first random access message;

means for sending the first random access message to a network apparatus using at least the first antenna and the second antenna of the M antennas on physical random access channel (PRACH) resources with an initial relative phase state including a first relative phase state between a signal transmitted by the first antenna and a signal transmitted by the second antenna;

means for monitoring for a random access response message from the network apparatus; and means for retransmitting the first random access message using a subsequent relative phase state including a second relative phase state different from the first relative phase state between the signal transmitted by the first antenna and the signal transmitted by the second antenna in response to failing to receive the random access response message from the network apparatus.

22. The user equipment of example 21, wherein the first relative phase state comprises a first relative phase rotation of φ between at least the first antenna and the second antenna and wherein the second relative phase state comprises a second relative phase rotation of φ+θ between at least the first antenna and the second antenna, wherein θ is in a range of 180°±100°.

23. The user equipment of example 22, wherein the PRACH resources include a plurality of subcarriers, and wherein the first relative phase state has no phase ramp across the plurality of subcarriers and the second relative phase state has no phase ramp across the plurality of subcarriers.

24. The user equipement of example 22 or 23, wherein the first relative phase rotation is zero degrees and wherein the second relative phase rotation is 180 degrees.

25. The user equipment of one of the preceding examples 21-24, wherein the means for retransmitting the first random access message using a subsequent relative phase state comprises means for retransmitting the first random access message using a plurality of subcarriers, wherein the first relative phase state comprises a first relative phase rotation of φ between at least the first antenna and the second antenna, wherein the second relative phase state comprises a second relative phase rotation of φ+θ between at least the first antenna and the second antenna and further comprises no phase ramp across the plurality of subcarriers, and wherein the user equipment further comprises:

means for receiving a random access response message from the network apparatus in response to the retransmitting the first random access message; and means for subsequently transmitting another random access message to the network apparatus using the second relative phase rotation.

26. The user equipement of example 25, wherein the means for subsequently transmitting another random access message to the network apparatus comprises means for transmitting a RACH msg 3 using the second relative phase rotation and using a phase ramp across the plurality of subcarriers.

27. The user equipment of one of the preceding examples 21-24, further comprising means for waiting at least a first backoff delay amount prior to the retransmitting the first random access message using the second relative phase state.

28. The user equipment of example 27, wherein the means for transmitting the first random access message comprises means for transmitting the first random access message at a first transmission power amount and wherein the means for retransmitting the first random access message using the second relative phase state comprises means for retransmitting the first random access message at a second transmission power amount greater than the first transmission power amount.

29. The user equipment of example 27, wherein the first backoff delay amount is a random backoff delay amount.

30. The user equipment of one of the preceding examples 21-29, further comprising;
means for receiving a random access response message from the network apparatus subsequent to the retransmitting; and
means for transmitting another random access message to the network apparatus using a relative phase rotation of the second relative phase state and using phase ramp across a plurality of subcarriers of the random access resources. 31. A computer program comprising computer-executable instructions that, when executed, cause a computer to perform the steps of one of the examples 1-12.

What is claimed is:

1. A method of wireless communication at a user equipment (UE) with M antennas including a first antenna and a second antenna, the method comprising:
in response to initiation of a random access channel (RACH) process, generating a first random access message;
sending the first random access message to a network apparatus using transmit diversity in which the first random access message is sent from at least the first antenna and the second antenna of the M antennas on physical random access channel (PRACH) resources for combined reception with an initial relative phase state including a first relative phase state between a signal transmitted by the first antenna and a signal transmitted by the second antenna;
monitoring for a random access response message from the network apparatus; and
in response to failing to receive the random access response message from the network apparatus, retransmitting the first random access message using the transmit diversity for the combined reception with a subsequent relative phase state including a second relative phase state having a relative phase rotation that is different from the first relative phase state between the signal transmitted by the first antenna and the signal transmitted by the second antenna, wherein the second relative phase state adjusts an alignment of a channel gain for the combined reception of the signal transmitted by the first antenna and a same signal transmitted by the second antenna.

2. The method of claim 1, wherein the first relative phase state comprises a first relative phase rotation of $\varphi$ between at least the first antenna and the second antenna and wherein the second relative phase state comprises a second relative phase rotation of $\varphi+\theta$ between at least the first antenna and the second antenna, wherein $\theta$ is in a range of $180°±100°$.

3. The method of claim 2, wherein the PRACH resources include a plurality of subcarriers, and wherein the first relative phase state has no phase ramp across the plurality of subcarriers and the second relative phase state has no phase ramp across the plurality of sub carriers.

4. The method of claim 2, wherein the first relative phase rotation is zero degrees and wherein the second relative phase rotation is 180 degrees.

5. The method of claim 1, wherein the first random access message is retransmitted using a plurality of subcarriers, wherein the first relative phase state comprises a first relative phase rotation of $\varphi$ between at least the first antenna and the second antenna, wherein the second relative phase state comprises a second relative phase rotation of $\varphi+\theta$ between at least the first antenna and the second antenna and further comprises no phase ramp across the plurality of subcarriers, and wherein the method further comprises:
receiving the random access response message from the network apparatus in response to the retransmitting the first random access message; and
subsequently transmitting another random access message to the network apparatus using the second relative phase rotation.

6. The method of claim 5, wherein subsequently transmitting another random access message to the network apparatus comprises transmitting a RACH msg 3 using the second relative phase rotation and using a phase ramp across the plurality of subcarriers.

7. The method of claim 1, wherein prior to the retransmitting the first random access message using the second relative phase state, the user equipment waits at least a first backoff delay amount.

8. The method of claim 7, wherein transmitting the first random access message comprises transmitting the first random access message at a first transmission power amount and wherein retransmitting the first random access message using the second relative phase state comprises retransmitting the first random access message at a second transmission power amount greater than the first transmission power amount.

9. The method of claim 7, wherein the first backoff delay amount is a random backoff delay amount.

10. The method of claim 1, wherein the M antennas further include a third antenna and a fourth antenna, and wherein sending the first random access message to the network apparatus comprises sending the first random access message using at least the first antenna, the second antenna, the third antenna, and the fourth antenna using the initial relative phase state, wherein the initial relative phase state comprises no phase ramp across a plurality of transmission subcarriers of the PRACH resources and further comprises an initial relative phase rotation among signals transmitted by the first antenna, the second antenna, the third antenna, and the fourth antenna, and wherein retransmitting the first random access message using the subsequent relative phase state comprises retransmitting the first random access message using at least two of the first antenna, the second antenna, the third antenna, and the fourth antenna with no phase ramp across subcarriers and with the subsequent relative phase state different from the initial relative phase state.

11. The method of claim 1, where M is greater than two, wherein sending the first random access message to the network apparatus comprises sending the first random access message using all of the M antennas, wherein the initial relative phase state is among signals transmitted by the M antennas, and wherein retransmitting the first random access message using the subsequent relative phase state comprises retransmitting the first random access message using all of the M antennas with each of the M antennas having an initial phase rotation relative to the first antenna of the M antennas.

12. The method of claim 11, further comprising, in response to failing to receive the random access response message from the network apparatus after retransmitting the first random access message, retransmitting the first random access message using another subsequent relative phase state with each of the M antennas having a phase rotation of a multiple of an associated initial phase rotation relative to the first antenna of the M antennas.

13. A user equipment (UE) comprising:
M antennas, wherein the M antennas include at least a first antenna and a second antenna;
a transceiver coupled with the M antennas;
a processor coupled with the transceiver; and
memory in communication with the processor, the processor and the memory configured to:
generate a first random access message;
initiate transmission of the first random access message from the UE to a network apparatus using transmit diversity in which the first random access message is sent from at least the first antenna and the second antenna of the M antennas on physical random access channel (PRACH) resources for combined reception with an initial relative phase state including a first relative phase state between a signal transmitted by the first antenna and a signal transmitted by the second antenna;
monitor for a random access response message from the network apparatus; and
in response to failing to receive the random access response message from the network apparatus, initiate a retransmission of the first random access message using the transmit diversity for the combined reception with a subsequent relative phase state including a second relative phase state having a relative phase rotation that is different from the first relative phase state between the signal transmitted by the first antenna and the signal transmitted by the second antenna, wherein the second relative phase state adjusts an alignment of a channel gain for the combined reception of the signal transmitted by the first antenna and a same signal transmitted by the second antenna.

14. The user equipment of claim 13, wherein the first relative phase state comprises a first relative phase rotation of $\varphi$ between at least the first antenna and the second antenna and wherein the second relative phase state comprises a second relative phase rotation of $\varphi+\theta$ between at least the first antenna and the second antenna, wherein $\theta$ is in a range of $180°\pm100°$.

15. The user equipment of claim 13, wherein the PRACH resources include a plurality of subcarriers, and wherein the first relative phase state has no phase ramp across the plurality of subcarriers and the second relative phase state has no phase ramp across the plurality of subcarriers.

16. The user equipment of claim 13, wherein the first random access message is retransmitted using a plurality of subcarriers, wherein the first relative phase state comprises a first relative phase rotation of $\varphi$ between at least the first antenna and the second antenna, wherein the second relative phase state comprises a second relative phase rotation of $\varphi+\theta$ between at least the first antenna and the second antenna and further comprises no phase ramp across the plurality of subcarriers, and wherein the processor and the memory are further configured to:
receive the random access response message from the network apparatus in response to the retransmission of the first random access message; and
subsequently generate another random access message to transmit to the network apparatus using the second relative phase rotation.

17. The user equipment of claim 16, wherein the another random access message comprises a RACH msg 3 and wherein the RACH msg 3 is transmitted using the second relative phase rotation and using a phase ramp across the plurality of subcarriers.

18. The user equipment of claim 13, wherein the processor and the memory are further configured to wait at least a first backoff delay amount prior to the retransmission of the first random access message using the second relative phase state.

19. The user equipment of claim 18, wherein the first random access message is transmitted at a first transmission power amount and retransmitted at a second transmission power amount greater than the first transmission power amount.

20. The user equipment of claim 13, wherein the M antennas are antenna elements, wherein the first random access message is a RACH msg 1, the network apparatus is a giga-NodeB (gNB) and the PRACH resources are received from the gNB in a system information block (SIB).

21. A user equipment (UE) with M antennas including a first antenna and a second antenna, the user equipment comprising:
means for generating a first random access message;
means for sending the first random access message to a network apparatus using transmit diversity in which the first random access message is sent from at least the first antenna and the second antenna of the M antennas on physical random access channel (PRACH) resources for combined reception with an initial relative phase state including a first relative phase state between a signal transmitted by the first antenna and a signal transmitted by the second antenna;
means for monitoring for a random access response message from the network apparatus; and
means for retransmitting the first random access message using the transmit diversity for the combined reception with a subsequent relative phase state including a second relative phase state having a relative phase rotation that is different from the first relative phase state between the signal transmitted by the first antenna and the signal transmitted by the second antenna in response to failing to receive the random access response message from the network apparatus, wherein the second relative phase state adjusts an alignment of a channel gain for the combined reception of the signal transmitted by the first antenna and a same signal transmitted by the second antenna.

22. The user equipment of claim 21, wherein the first relative phase state comprises a first relative phase rotation of $\varphi$ between at least the first antenna and the second antenna and wherein the second relative phase state comprises a second relative phase rotation of $\varphi+\theta$ between at least the first antenna and the second antenna, wherein $\theta$ is in a range of $180°\pm100°$.

23. The user equipment of claim 22, wherein the PRACH resources include a plurality of subcarriers, and wherein the first relative phase state has no phase ramp across the plurality of subcarriers and the second relative phase state has no phase ramp across the plurality of subcarriers.

24. The user equipment of claim 22, wherein the first relative phase rotation is zero degrees and wherein the second relative phase rotation is 180 degrees.

25. The user equipment of claim 21, wherein the means for retransmitting the first random access message using the subsequent relative phase state comprises means for retransmitting the first random access message using a plurality of subcarriers, wherein the first relative phase state comprises a first relative phase rotation of $\varphi$ between at least the first antenna and the second antenna, wherein the second relative phase state comprises a second relative phase rotation of $\varphi+\theta$ between at least the first antenna and the second antenna and further comprises no phase ramp across the plurality of subcarriers, and wherein the user equipment further comprises:
- means for receiving the random access response message from the network apparatus in response to a retransmission of the first random access message; and
- means for subsequently transmitting another random access message to the network apparatus using the second relative phase rotation.

26. The user equipment of claim 25, wherein the means for subsequently transmitting another random access message to the network apparatus comprises means for transmitting a RACH msg 3 using the second relative phase rotation and using a phase ramp across the plurality of subcarriers.

27. The user equipment of claim 21, further comprising means for waiting at least a first backoff delay amount prior to a retransmission of the first random access message using the second relative phase state.

28. The user equipment of claim 27, wherein the means for transmitting the first random access message comprises means for transmitting the first random access message at a first transmission power amount and wherein the means for retransmitting the first random access message using the second relative phase state comprises means for retransmitting the first random access message at a second transmission power amount greater than the first transmission power amount.

29. The user equipment of claim 27, wherein the first backoff delay amount is a random backoff delay amount.

30. The user equipment of claim 21, further comprising:
- means for receiving the random access response message from the network apparatus subsequent to a retransmission; and
- means for transmitting another random access message to the network apparatus using the relative phase rotation of the second relative phase state and using phase ramp across a plurality of subcarriers of the PRACH resources.

31. The method of claim 1, wherein the transmit diversity includes transmission of the signal from the first antenna and the same signal from the second antenna for the combined reception.

* * * * *